US012789597B2

(12) United States Patent
Tanaka et al.

(10) Patent No.: US 12,789,597 B2
(45) Date of Patent: Nov. 10, 2026

(54) ATTACHMENT STRUCTURE FOR VEHICLE DOOR STRIKER

(71) Applicant: SUBARU CORPORATION, Tokyo (JP)

(72) Inventors: Masanori Tanaka, Tokyo (JP); Kenji Nakazawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 200 days.

(21) Appl. No.: 18/794,308

(22) Filed: Aug. 5, 2024

(65) Prior Publication Data

US 2025/0091416 A1 Mar. 20, 2025

(30) Foreign Application Priority Data

Sep. 19, 2023 (JP) ................................ 2023-151781

(51) Int. Cl.
*B60J 5/04* (2006.01)
*E05B 15/02* (2006.01)

(52) U.S. Cl.
CPC ......... *B60J 5/0468* (2013.01); *E05B 15/0205* (2013.01)

(58) Field of Classification Search
CPC .... B60J 5/0468; B60J 5/0469; E05B 15/0205
See application file for complete search history.

(56) References Cited

U.S. PATENT DOCUMENTS

2014/0159393 A1* 6/2014 Heo ........................ E05B 79/02 292/340
2017/0313166 A1* 11/2017 Sugie .................. B62D 25/025
2023/0067279 A1* 3/2023 Muraoka ................ B60R 22/24

FOREIGN PATENT DOCUMENTS

JP 2018203079 A * 12/2018

* cited by examiner

*Primary Examiner* — Yanick A Akaragwe
(74) *Attorney, Agent, or Firm* — McGinn IP Law Group, PLLC

(57) ABSTRACT

An attachment structure for a vehicle door striker includes a vehicle body and a striker. The vehicle body includes a skin panel member and a reinforcing panel member. The skin panel member constitutes a quarter panel and an outer panel of a pillar. The reinforcing panel member is disposed on an inner side of the skin panel member in a vehicle width direction. The reinforcing panel member reinforces the pillar. The pillar constitutes a part of a door opening. The striker is disposed on the vehicle body. The striker maintains a door in a closed state. An attachment portion for the striker is provided on the reinforcing panel member. Positioning holes used in assembling the vehicle body are respectively provided in the skin panel member and the reinforcing panel member. The positioning holes overlap with each other in a plan view.

20 Claims, 4 Drawing Sheets

ATTACHMENT STRUCTURE FOR VEHICLE DOOR STRIKER

CROSS-REFERENCE TO RELATED APPLICATIONS

The present application claims priority from Japanese Patent Application No. 2023-151781 filed on Sep. 19, 2023, the entire contents of which are hereby incorporated by reference.

BACKGROUND

The disclosure relates to an attachment structure for a vehicle door striker.

In general, a vehicle body of an automobile vehicle includes a pillar extending in an upper-lower direction, and the pillar constitutes a part of a door opening. A door striker that engages with a latch of a vehicle door is provided in the pillar of the door opening. The striker protrudes from an outer panel of the pillar and engages with the latch of the vehicle door in a closed state. The outer panel of the pillar includes a skin panel member that is integral with a quarter panel that constitutes a fender or the like of the vehicle. Therefore, if the striker is attached to the outer panel of the pillar, when the vehicle door is closed, an input from the vehicle door is transmitted from the outer panel of the pillar to the quarter panel. As a result, there is a problem that when the vehicle door is closed, the quarter panel vibrates and generates sound.

SUMMARY

An aspect of the disclosure provides an attachment structure for a vehicle door striker. The attachment structure includes a vehicle body and a striker. The vehicle body includes a skin panel member and a reinforcing panel member. The skin panel member constitutes a quarter panel and an outer panel of a pillar. The reinforcing panel member is disposed on an inner side of the skin panel member in a vehicle width direction. The reinforcing panel member is configured to reinforce the pillar. The pillar constitutes a part of a door opening. The striker is disposed on the vehicle body. The striker is configured to maintain a door in a closed state. An attachment portion for the striker is provided on the reinforcing panel member. Positioning holes used in assembling the vehicle body are respectively provided in the skin panel member and the reinforcing panel member. The positioning holes overlap with each other in a plan view.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

As a structure that does not directly attach a striker to an outer panel, a structure is proposed in which a pillar reinforce is provided between an outer panel and an inner panel of a pillar, and a nut screwed to a fastening bolt of the striker is provided in the pillar reinforce (see, for example, Japanese Unexamined Patent Application Publication (JP-A) No. 2018-203079). In JP-A No. 2018-203079, a support in which the nut is provided in the pillar reinforce overlaps the outer panel, and one end portion and the other end portion continuous to the support are joined to the inner panel. With the attachment structure for a striker, transmission of an input from the vehicle door to a quarter panel is prevented. In JP-A No. 2018-203079, one end portion and the other end portion of the pillar reinforce are parallel to each other, so that before the one end portion and the other end portion are joined to the inner panel, a position of the pillar reinforce can be adjusted with respect to the inner panel in a vehicle front-rear direction and a vehicle upper-lower direction.

In the attachment structure described in JP-A No. 2018-203079, joining portions on the inner panel of the pillar with respect to the one end portion and the other end portion of the pillar reinforce are to be parallel to each other, which greatly constraints a shape of the inner panel. In addition, the position of the pillar reinforce with respect to the inner panel during assembling of a vehicle body is to be adjusted, and thus an assembling process of the vehicle body is complicated.

It is desirable to provide an attachment structure for a vehicle door striker that prevents sound generation of a quarter panel when a door is closed, and may accurately determine a position of a reinforcing panel member with respect to an outer panel of a pillar without performing an inconvenient adjustment work during assembling of a vehicle body.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
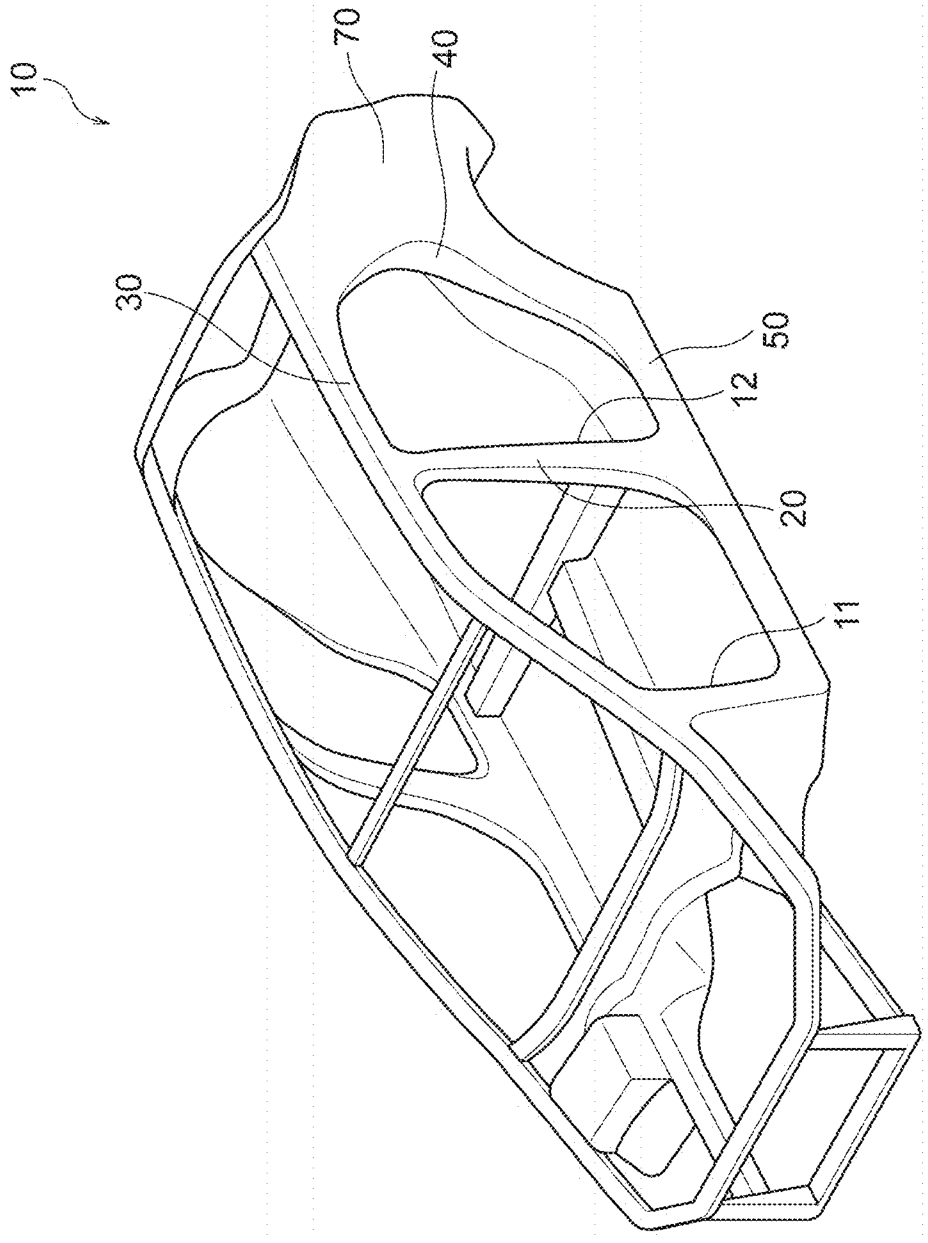
FIG. 1 is a schematic perspective view illustrating a vehicle body according to an embodiment of the disclosure.
Figure 2:
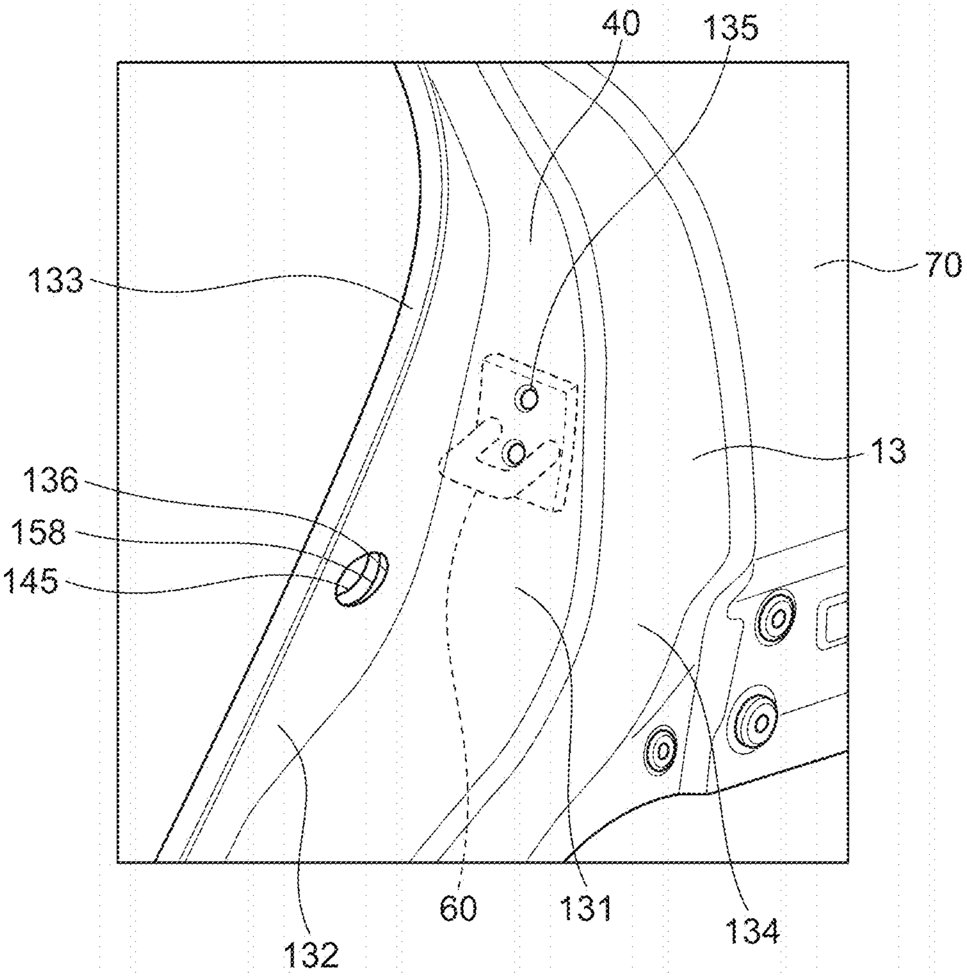
FIG. 2 is an external perspective view illustrating a striker arrangement portion of a door opening of the vehicle body.
Figure 3:
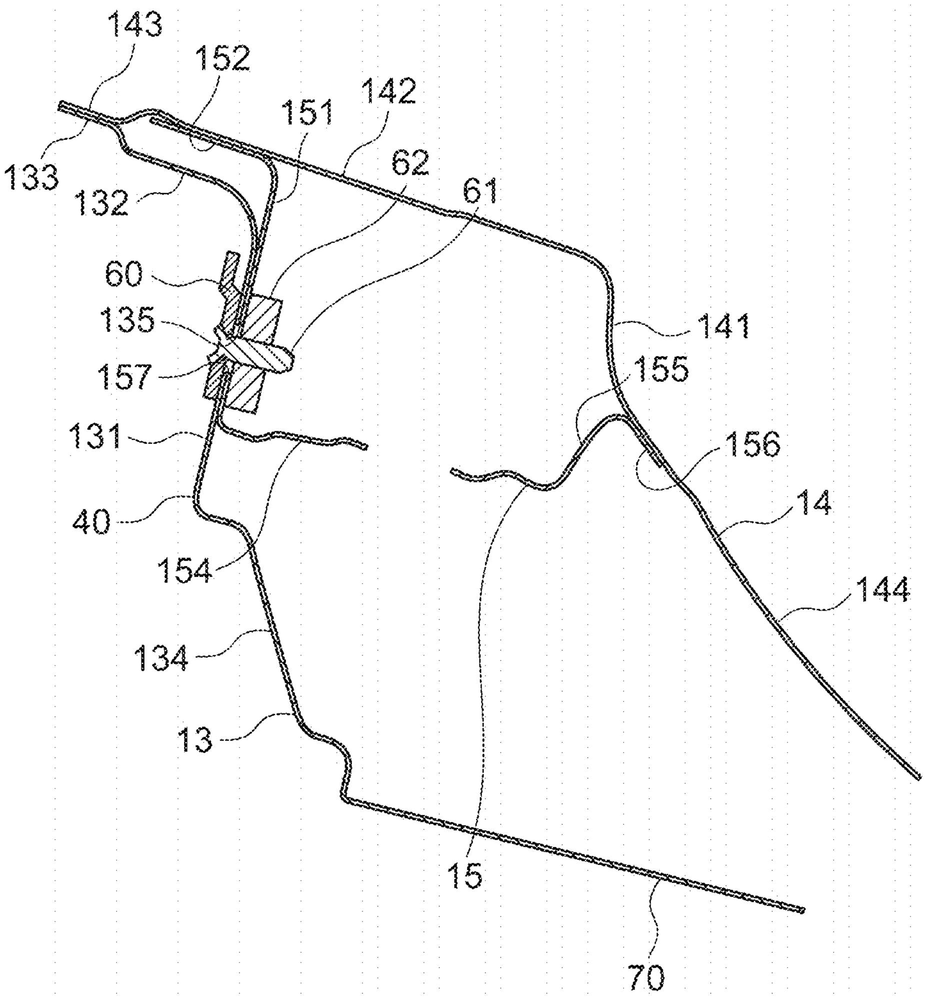
FIG. 3 is a top cross-sectional view of the striker arrangement portion of the vehicle body.
Figure 4:
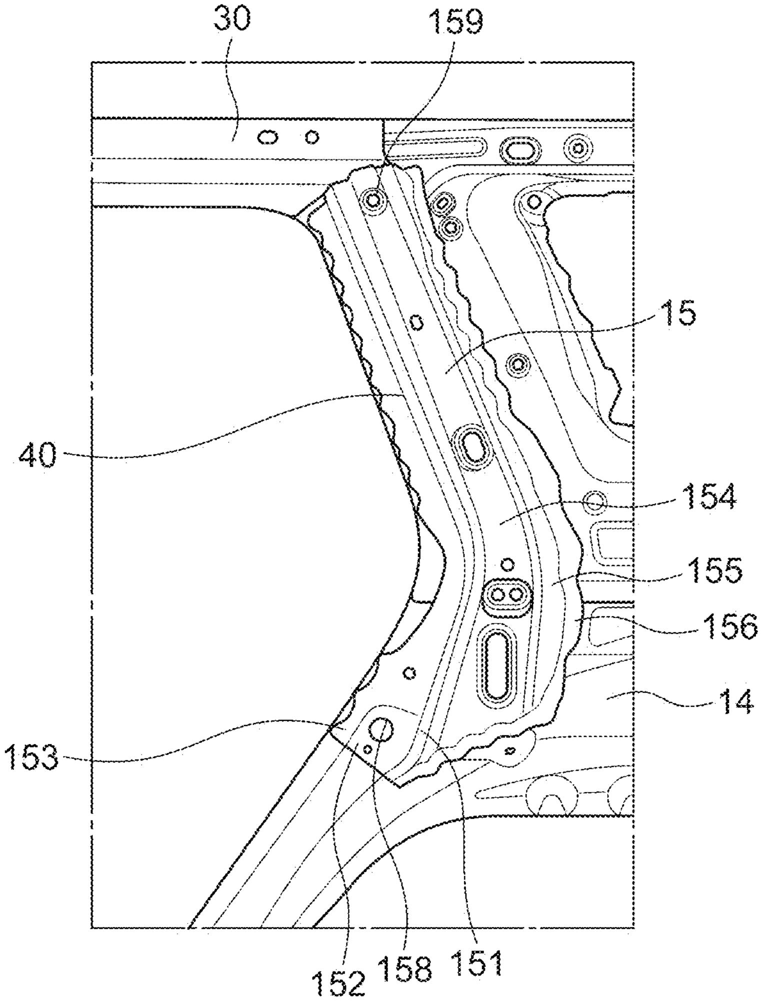
FIG. 4 is a partial side view of the vehicle body in a state where a skin panel member is removed.

FIGS. 1 to 4 illustrate the embodiment of the disclosure. FIG. 1 is a schematic perspective view of a vehicle body. FIG. 2 is an external perspective view illustrating a striker arrangement portion of a door opening of the vehicle body. FIG. 3 is a top cross-sectional view of the striker arrangement portion of the vehicle body. FIG. 4 is a partial side view of the vehicle body in a state where a skin panel member is removed.

An attachment structure for a door striker according to the embodiment is used in an automobile vehicle. As illustrated in FIG. 1, a vehicle body 10 of the automobile vehicle includes door openings 11 and 12 through which an occupant gets on and off. The vehicle body 10 according to the embodiment includes the front door opening 11, which is opened and closed by a front door (not illustrated), for an occupant seated in a front seat, and the rear door opening 12, which is opened and closed by a rear door (not illustrated), for an occupant seated in a rear seat. The attachment structure for a door striker according to the embodiment is applied to the rear door opening 12.

In the embodiment, the rear door opening 12 includes a B-pillar 20, a roof rail 30, a C-pillar 40, and a side sill 50. The rear door is a swing door and is rotatably supported by a hinge (not illustrated) provided on the B-pillar 20. In addition, the rear door includes a latch mechanism that engages with a striker 60 (see FIG. 2) provided on the C-pillar 40.

As illustrated in FIG. 2, the striker 60 is attached to the C-pillar 40 of the rear door opening 12. In FIG. 2, the striker 60 is indicated by a dashed line. In the embodiment, as illustrated in FIG. 3, the striker 60 is attached to the C-pillar 40 by a bolt 61 and a nut 62.

As illustrated in FIG. 2, the vehicle body 10 includes a skin panel member 13 which constitutes an outer panel of the C-pillar 40 and which constitutes a quarter panel 70 behind the C-pillar 40. As illustrated in FIG. 3, the skin panel member 13 includes a first extending portion 131 extending in a vehicle width direction, a second extending portion 132 extending forward from an inner end of the first extending portion 131, and a flange 133 provided at a front end of the second extending portion 132 and offset inward in the vehicle width direction from the second extending portion 132. In addition, the skin panel member 13 includes a third extending portion 134 which couples an outer end of the first extending portion 131 and a front end of the quarter panel 70, and which extends obliquely rearward toward the outer side in the vehicle width direction.

The vehicle body 10 includes an inner panel member 14 which constitutes an inner panel of the C-pillar 40 and which constitutes a wheelhouse panel (not illustrated) behind the C-pillar 40. The inner panel member 14 includes a first extending portion 141 extending in the vehicle width direction, a second extending portion 142 extending forward from an inner end of the first extending portion 141, and a flange 143 provided at a front end of the second extending portion 142 and offset outward in the vehicle width direction from the second extending portion 142. In addition, the inner panel member 14 includes a third extending portion 144 extending obliquely rearward toward the outer side in the vehicle width direction from an outer end of the first extending portion 141. The skin panel member 13 and the inner panel member 14 are joined to each other by the flanges 133 and 143. In the embodiment, the skin panel member 13 and the inner panel member 14 are also joined to each other at predetermined portions of the quarter panel 70 and the wheelhouse panel.

The vehicle body 10 includes a reinforcing panel member 15 for reinforcing the C-pillar 40. The reinforcing panel member 15 includes a first extending portion 151 extending in the vehicle width direction and a second extending portion 152 extending forward from an inner end of the first extending portion 151. As illustrated in FIG. 4, the reinforcing panel member 15 includes a front flange 153 provided at a front end of the second extending portion 152 and offset outward in the vehicle width direction from the second extending portion 152. As illustrated in FIG. 3, the reinforcing panel member 15 includes a third extending portion 154 extending rearward from an outer end of the first extending portion 151, a fourth extending portion 155 extending inward in the vehicle width direction from a rear end of the third extending portion 154, and a rear flange 156 extending rearward from an inner end of the fourth extending portion 155 along the inner panel member 14.

In the embodiment, the skin panel member 13 and the reinforcing panel member 15 are not joined to each other at the first extending portion 131 and the first extending portion 151. The first extending portion 151 constitutes a design surface of the door opening 12, and weld marks or the like may not appear on the design surface. The inner panel member 14 and the reinforcing panel member 15 are joined to each other at the flange 143 and the front flange 153, and are joined to each other at the third extending portion 144 and the rear flange 156. In the embodiment, the inner panel member 14 and the reinforcing panel member 15 form a closed cross section. The inner panel member 14 and the reinforcing panel member 15 constitutes a framework of the vehicle body 10.

As illustrated in FIG. 3, the nut 62 serving as an attachment portion for the striker 60 is provided on a rear surface of the first extending portion 151 of the reinforcing panel member 15. A portion of the first extending portion 151 in which the nut 62 is disposed is overlapped with the first extending portion 131 of the skin panel member 13. The first extending portion 131 of the skin panel member 13 and the first extending portion 151 of the reinforcing panel member 15 respectively have insertion holes 135 and 157 for the bolt 61. The striker 60 disposed on a front surface of the first extending portion 131 of the skin panel member 13 is attached to the vehicle body 10 side by the bolt 61 screwed to the nut 62 provided on the first extending portion 151 of the reinforcing panel member 15.

As illustrated in FIG. 2, positioning holes 136 and 145 for positioning the skin panel member 13 and the inner panel member 14 are disposed respectively in the second extending portion 132 of the skin panel member 13 and the second extending portion 142 of the inner panel member 14. The positioning holes 136 and 145 overlap each other in a plan view. The skin panel member 13 and the inner panel member 14 are positioned with respect to each other by a pin serving as a jig inserted through the positioning holes 136 and 145 during assembling of the vehicle body.

As illustrated in FIG. 2, a positioning hole 158, which positions the reinforcing panel member 15 with respect to the skin panel member 13, is provided in the second extending portion 152 of the reinforcing panel member 15. In the embodiment, the positioning hole of the reinforcing panel member 15 overlaps the positioning hole 136 of the skin panel member 13 and the inner panel member 14 in the plan view. Accordingly, the reinforcing panel member 15 is positioned with respect to the skin panel member 13 during assembling of the vehicle body.

As illustrated in FIG. 4, in the embodiment, the reinforcing panel member 15 extends in an upper-lower direction, and positioning holes 158 and 159, which are used for positioning the reinforcing panel member 15 with respect to other panel members during assembling of the vehicle body, are provided in a lower end side and an upper end side. The positioning hole 159 on the upper end side is provided on an upper end side of the third extending portion 154.

According to the attachment structure for a vehicle door striker configured as described above, since the nut 62 serving as the attachment portion for the striker 60 is provided on the reinforcing panel member 15, when the rear door is closed, an input from the rear door is mainly transmitted to the reinforcing panel member 15 via the striker 60. Accordingly, the input to the skin panel member 13 from the rear door can be prevented, and vibration and sound of the quarter panel 70 when the rear door is closed can be prevented.

Since the reinforcing panel member 15 on which the attachment portion for the striker 60 is provided is not joined to the first extending portion 131 of the skin panel member 13 that constitutes the design surface of the door opening 12 on the rear side, weld marks or the like may not appear on the design surface of the door opening 12. Therefore, as compared with a case in which a reinforcing member provided according to the striker 60 is joined to the skin panel member 13, commerciality of the vehicle can be improved.

Since the positioning holes 136 and 158 that overlap with each other in the plan view are provided in the skin panel member 13 and the reinforcing panel member 15, respectively, the panel members 13, 14, and 15 can be joined to one another in a state in which the skin panel member 13 and the reinforcing panel member 15 are positioned using the pin during the assembling of the vehicle body. Therefore, the position of the reinforcing panel member 15 with respect to the panel members 13 and 14 may not be adjusted. Accordingly, the skin panel member 13 and the reinforcing panel member 15 are assembled with desired positional accuracy, and excessive residual stress is not generated in the skin panel member 13 due to large misalignment of the position of the skin panel member 13 with respect to the reinforcing panel member 15.

In the embodiment, the positioning holes 136 and 145 and the pin used for positioning the skin panel member 13 and the inner panel member 14 are used to position the skin panel member 13 and the reinforcing panel member 15. Therefore, additional positioning holes may not be provided in the skin panel member 13, or a pin used for positioning during assembling of the vehicle body may not be additionally prepared.

In the above-described embodiment, the positioning holes 136 and 145 and the pin used for positioning the skin panel member 13 and the inner panel member 14 are used for positioning the skin panel member 13 and the reinforcing panel member 15. However, the positioning of the skin panel member 13 and the reinforcing panel member 15 may be performed independently of the inner panel member 14.

In the above-described embodiment, the reinforcing panel member 15 extends in the upper-lower direction. However, the reinforcing panel member 15 may be partially provided on the C-pillar 40 in the upper-lower direction. In addition, the reinforcing panel member 15 and other panel members may not form a closed cross section.

In the above-described embodiment, the striker 60 is attached to the reinforcing panel member 15 by the bolt 61 and the nut 62. However, a unit for attaching the striker 60 to the reinforcing panel member 15 is not limited to the bolt 61 and the nut 62.

The embodiment(s) of the disclosure have been described above. It is noted that the above embodiment(s) do not limit the scope of claims. It is also noted that all combinations of features described in the embodiment(s) may not be essential.

According to the disclosure, the sound of the quarter panel when the door is closed can be prevented, and the position of the reinforcing panel member with respect to the outer panel of the pillar may be accurately determined without performing an inconvenient adjustment work during the assembling of the vehicle body.

According to the attachment structure for a vehicle door striker, since the attachment portion for the striker is provided on the reinforcing panel member, when the door is closed, the input from the door is mainly transmitted to the reinforcing panel member via the striker. Accordingly, the input to the skin panel member from the door can be prevented, and vibration and sound of the quarter panel when the door is closed can be prevented.

In addition, the reinforcing panel member on which the attachment portion for the striker is provided may not be joined to a portion of the skin panel member that constitutes the design surface of the door opening. Accordingly, weld marks or the like may not appear on the design surface of the door opening, and the commerciality of the vehicle can be improved as compared with the case in which the reinforcing member is joined to the skin panel member.

Since the positioning holes that overlap with each other in the plan view are provided in the skin panel member and the reinforcing panel member, respectively, the panel members can be joined to one another in a state in which the skin panel member and the reinforcing panel member are positioned using the jig during the assembling of the vehicle body. Therefore, the position of the reinforcing panel member with respect to the skin panel member may not be adjusted. Accordingly, the skin panel member and the reinforcing panel member are assembled with desired positional accuracy, and excessive residual stress is be not generated in the skin panel member due to large misalignment of the position of the skin panel member with respect to the reinforcing panel member.

The invention claimed is:

1. An attachment structure for a vehicle door striker, the attachment structure comprising:

a vehicle body comprising a skin panel member that constitutes a quarter panel and an outer panel of a pillar, an inner panel member that constitutes an inner panel of the pillar, and a reinforcing panel member disposed on an inner side of the skin panel member in a vehicle width direction, the reinforcing panel member being configured to reinforce the pillar, the pillar constituting a part of a door opening; and a striker disposed on the vehicle body, the striker being configured to maintain a door in a closed state, wherein an attachment portion for the striker is provided on the reinforcing panel member, and positioning holes used in assembling the vehicle body are respectively provided in the skin panel member and the reinforcing panel member, the positioning holes overlapping with each other in a plan view, and the inner panel member is provided with a positioning hole overlapping with the positioning holes of the skin panel member and the reinforcing panel member in the plan view, the positioning hole of the inner panel member being used in assembling the vehicle body.

2. The attachment structure for the vehicle door striker according to claim 1, wherein the reinforcing panel member and the inner panel member form a closed cross section.

3. The attachment structure for the vehicle door striker according to claim 2, wherein the attachment portion for the striker comprises a nut provided on the reinforcing panel member, and the striker is attached to the vehicle body by a bolt that is inserted through the skin panel member and the reinforcing panel member and that is screwed into the nut.

4. The attachment structure for the vehicle door striker according to claim 1, wherein the reinforcing panel member extends in an upper-lower direction, and the positioning hole of the reinforcing panel member is provided on a lower end side of the reinforcing panel member.

5. The attachment structure for the vehicle door striker according to claim 4, wherein the reinforcing panel member further comprises a second positioning hole provided on an upper end side of the reinforcing panel member opposite the lower end side, the second positioning hole being used in assembling the vehicle body.

6. The attachment structure for the vehicle door striker according to claim 1, wherein the attachment portion for the striker comprises a nut provided on the reinforcing panel member, and the striker is attached to the vehicle body by a bolt that is inserted through the skin panel member and the reinforcing panel member and that is screwed into the nut.

7. The attachment structure for the vehicle door striker according to claim 1, wherein the attachment portion for the striker comprises a nut provided on the reinforcing panel member, and the striker is attached to the vehicle body by a bolt that is inserted through the skin panel member and the reinforcing panel member and that is screwed into the nut.

8. The attachment structure for the vehicle door striker according to claim 1, wherein the door opening comprises a B-pillar, a roof rail, the pillar, and a side sill, the pillar is a C-pillar, the door is a rear door rotatably supported by a hinge provided on the B-pillar, and the door comprises a latch mechanism configured to engage with the striker.

9. The attachment structure for the vehicle door striker according to claim 1, wherein the skin panel member comprises a first extending portion extending in the vehicle width direction, a second extending portion extending forward from an inner end of the first extending portion of the skin panel member, and a flange provided at a front end of the second extending portion of the skin panel member and offset inward in the vehicle width direction from the second extending portion of the skin panel member.

10. The attachment structure for the vehicle door striker according to claim 9, wherein the skin panel member further comprises a third extending portion coupling an outer end of the first extending portion of the skin panel member and a front end of the quarter panel, the third extending portion of the skin panel member extending obliquely rearward toward an outer side in the vehicle width direction.

11. The attachment structure for the vehicle door striker according to claim 9, wherein the inner panel member comprises a first extending portion extending in the vehicle width direction, a second extending portion extending forward from an inner end of the first extending portion of the inner panel member, and a flange provided at a front end of the second extending portion of the inner panel member and offset outward in the vehicle width direction from the second extending portion of the inner panel member, the flange of the inner panel member being joined to the flange of the skin panel member.

12. The attachment structure for the vehicle door striker according to claim 11, wherein the inner panel member further comprises a third extending portion extending obliquely rearward toward an outer side in the vehicle width direction from an outer end of the first extending portion of the inner panel member.

13. The attachment structure for the vehicle door striker according to claim 12, wherein the reinforcing panel member comprises a first extending portion extending in the vehicle width direction, a second extending portion extending forward from an inner end of the first extending portion of the reinforcing panel member, and a front flange provided at a front end of the second extending portion of the reinforcing panel member and offset outward in the vehicle width direction from the second extending portion of the reinforcing panel member, the front flange of the reinforcing panel member being joined to the flange of the inner panel member, and the attachment portion for the striker is provided on the first extending portion of the reinforcing panel member.

14. The attachment structure for the vehicle door striker according to claim 13, wherein the reinforcing panel member further comprises a third extending portion extending rearward from an outer end of the first extending portion of the reinforcing panel member, a fourth extending portion extending inward in the vehicle width direction from a rear end of the third extending portion of the reinforcing panel member, and a rear flange extending rearward from an inner end of the fourth extending portion of the reinforcing panel member along the inner panel member, the rear flange of the reinforcing panel member being joined to the third extending portion of the inner panel member.

15. The attachment structure for the vehicle door striker according to claim 1, wherein the attachment portion for the striker comprises a nut provided on a rear surface of a first extending portion of the reinforcing panel member, and a portion of the first extending portion of the reinforcing panel member in which the nut is disposed overlaps a first extending portion of the skin panel member in the vehicle width direction.

16. The attachment structure for the vehicle door striker according to claim 15, wherein the first extending portion of the skin panel member and the first extending portion of the reinforcing panel member respectively have insertion holes for a bolt of the striker, the striker being disposed on a front surface of the first extending portion of the skin panel member and attached to the vehicle body by the bolt screwed into the nut.

17. The attachment structure for the vehicle door striker according to claim 1, wherein the inner panel member further constitutes a wheelhouse panel disposed rearward of the pillar, and the skin panel member and the inner panel member are joined to each other at portions of the quarter panel and the wheelhouse panel.

18. The attachment structure for the vehicle door striker according to claim 1, wherein the positioning holes of the skin panel member, the inner panel member, and the reinforcing panel member are configured to receive a common positioning pin therethrough for positioning the reinforcing panel member relative to the skin panel member and the inner panel member during assembling of the vehicle body.

19. The attachment structure for the vehicle door striker according to claim 1, wherein the skin panel member and the reinforcing panel member are not joined to each other at a portion of the skin panel member that overlaps the attachment portion for the striker, the portion of the skin panel member constituting a design surface of the door opening.

20. The attachment structure for the vehicle door striker according to claim 1, wherein the reinforcing panel member extends in an upper-lower direction between a roof rail and a side sill of the door opening, and the positioning hole of the reinforcing panel member is located closer to the side sill than to the roof rail.

* * * * *